March 9, 1937.  J. KOMOROUS  2,073,421
RULE
Filed April 19, 1935
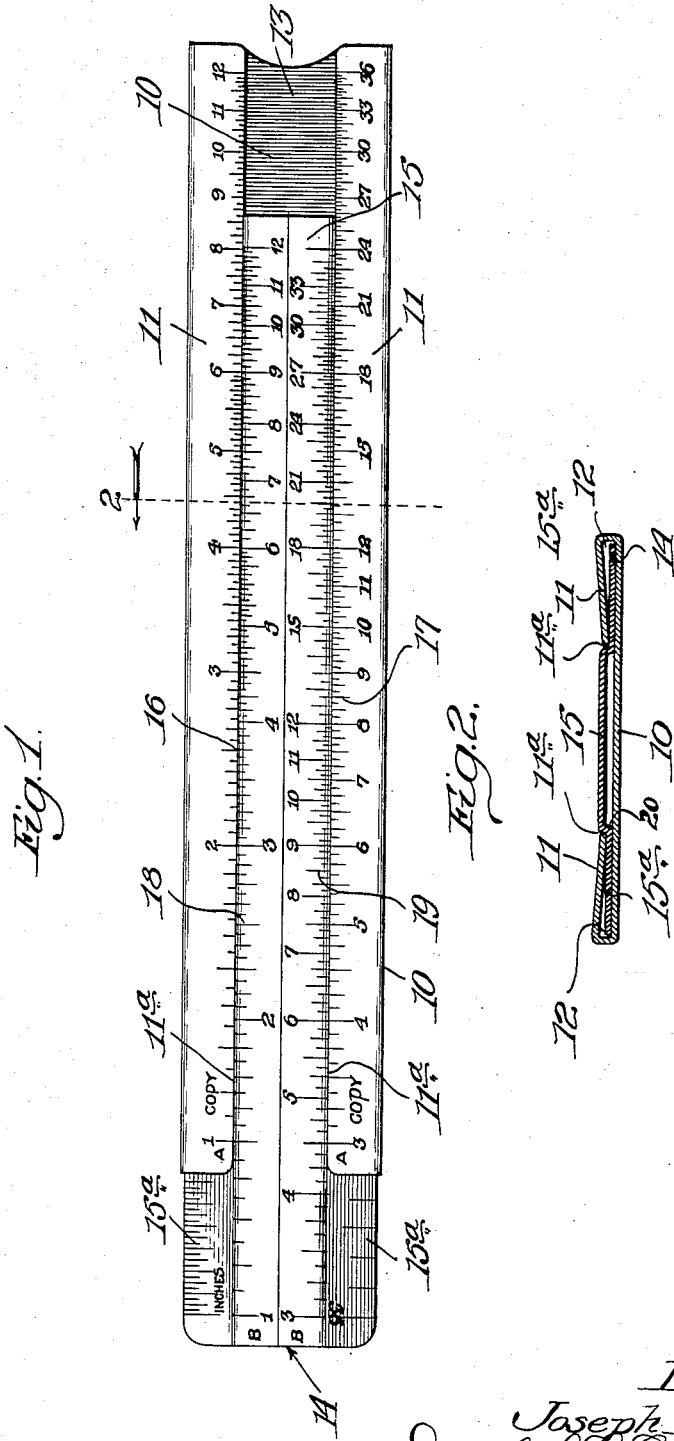
Inventor:
Joseph Komorous,
By Dyrenforth, Lee, Chritton & Wiles
Attys

UNITED STATES PATENT OFFICE 2,073,421

RULE

Joseph Komorous, Riverside, Ill., assignor to Parisian Novelty Company, Chicago, Ill., a corporation of Illinois Application April 19, 1935, Serial No. 17,317

1 Claim. (Cl. 235—70)

My invention relates to rules, particularly so-called slide-rules of the type comprising a base member having a scale or scales and a slide slidable lengthwise along the base member longitudinally thereof and having a scale or scales movable along the scale or scales on the base member.

My object, generally stated, is to provide a novel construction of such a rule and particularly one which may be made very economically and the scale or scales on the slide of which may be easily and accurately registered with and read in connection with, the scale or scales on the base member.

Another object is to provide such a rule the slide of which may be made of flexible material, such as sheet celluloid, and of reinforced stiffened construction, to give it the desired enhanced rigidity over a flat celluloid strip and the scale or scales on the edge or edges of which will be in substantially the same plane as the scale or scales on the base member in order that proper registration of the scales may be more easily effected in adjusting the slide, and readings be accurately made.

Referring to the accompanying drawing:

Figure 1 is a face view of my improved rule construction showing the slide partially withdrawn; and Figure 2, an enlarged transverse section taken at the line 2 on Fig. 1 and viewed in the direction of the arrow.

The scale according to the preferred illustrated embodiment of my invention comprises a base member 10 formed, as for example and preferably, of a sheet of celluloid with its longitudinal edge portions turned inwardly to the position shown to overlie, but be spaced from, the underlying portion of the sheet and form the straight-edge downwardly sloping portions 11 spaced apart at their adjacent edges 11ᵃ and which, with the underlying part of the base member, form inwardly opening grooves or channels 12 which open into a recess 13 formed between the portions 11.

The rule also comprises a slide 14 of flexible material, such as and preferably celluloid, the central longitudinal portion of which is upwardly and preferably vertically offset as represented at 15 throughout its length. The slide extends slidingly at its lateral portions 15ᵃ in the grooves 12 and at its central portion into the space between the portions 11 of the base member, substantially filling the space, with the upper exposed face of the offset portion 15 substantially flush with the exposed faces of the portions 11. The vertical offset of the central portion of the slide provides shoulders 20 against which the edges 11ᵃ bear.

The edges of the portions 11 and the edges of the offset portion 15 are provided with scales 16—19, inclusive, as is common in constructions of slide rules.

The exposed faces of the offset portions 15 and the edge portions 11 being in substantially the same plane the user of the scale in adjusting the slide 14 may readily accurately position the graduations of the scales on the slide with the graduations of the scales on the base member and more easily read the registering markings than in the case of a construction in which the scales on the slide are at a lower elevation than those on the base member.

Furthermore, the provision of the offset portion 15 stiffens the slide against distortion, permitting of the use of a minimum thickness of sheet material from which to make the slide and still giving the feel, in adjusting the slide, of a slide of considerably greater thickness than of the sheet material actually used.

While I have illustrated and described a particular embodiment of my invention, I do not wish to be understood as intending to limit it thereto as the same may be variously altered and modified without departing from the spirit of my invention.

What I claim as new, and desire to secure by Letters Patent, is:

A slide rule comprising a body member formed of celluloid sheet material having a base and having its longitudinal edge portions inturned into spaced relation to form inwardly opening channels, a slide formed of celluloid having a central portion in the same plane as the inturned edge portions of the body, and having downwardly offset lateral portions extending into the channels thereof, said offset portions having extensions at right angles thereto in a plane parallel to the plane of the base of the body member, whereby the central portion of the slide is provided with substantially subjacent support, said inturned edge portions sloping slightly downwards to provide a free channel except at the inner edges, said inner edges bearing against the lateral portions of the central member, and slide having scales on the exposed faces of said edge portions and said central portions.

JOSEPH KOMOROUS.